Nov. 6, 1923.　　　J. C. CROMWELL　　　1,473,283
WHEEL
Filed Jan. 19, 1920　　　5 Sheets-Sheet 1

WITNESS
R. H. Balderson

INVENTOR
John C. Cromwell
by Bakewell, Byrnes & Parmelee
his attys.

Nov. 6, 1923.

J. C. CROMWELL

WHEEL

Filed Jan. 19, 1920

Nov. 6, 1923.
J. C. CROMWELL
WHEEL
Filed Jan. 19, 1920 5 Sheets-Sheet 3
1,473,283
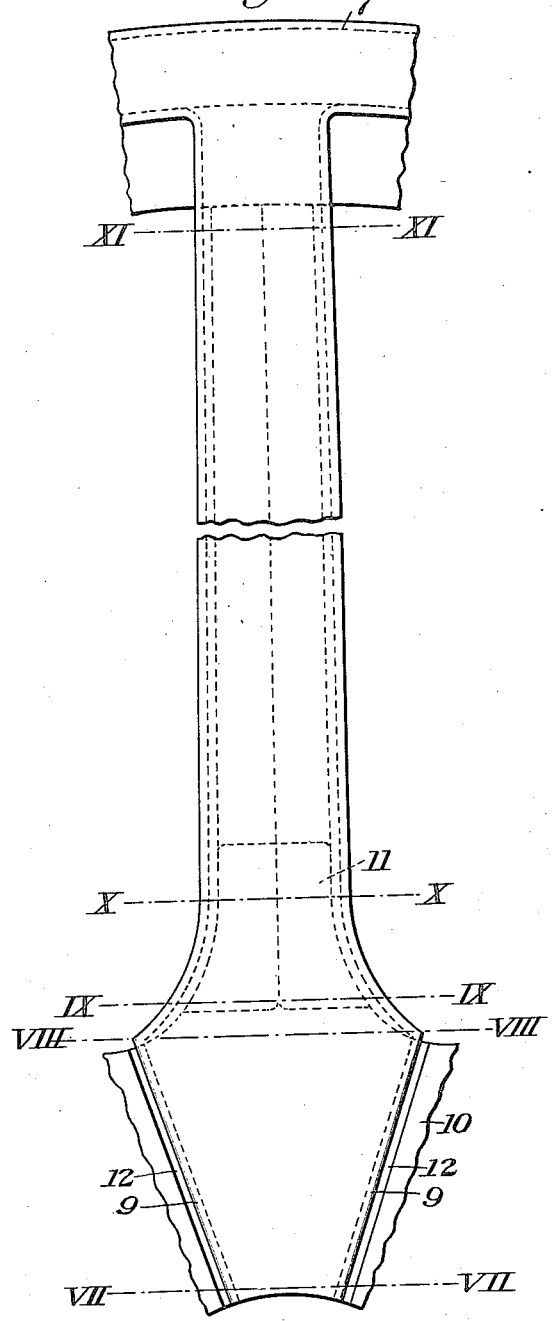
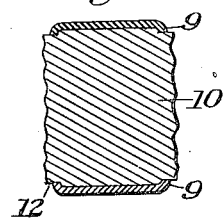
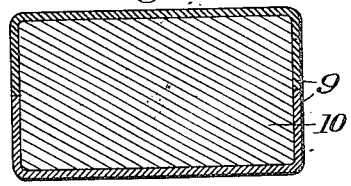
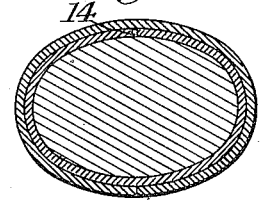
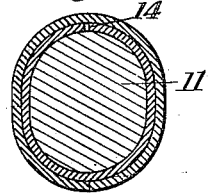
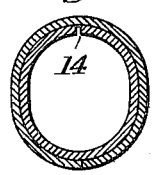
WITNESS
R A Balderson
INVENTOR
John C. Cromwell,
By Bakewell, Byrnes Parmelee
his attys.

Nov. 6, 1923.

J. C. CROMWELL

WHEEL

Filed Jan. 19, 1920

WITNESS

INVENTOR

Nov. 6, 1923.  J. C. CROMWELL  1,473,283
WHEEL
Filed Jan. 19, 1920   5 Sheets-Sheet 5
Fig. 15.
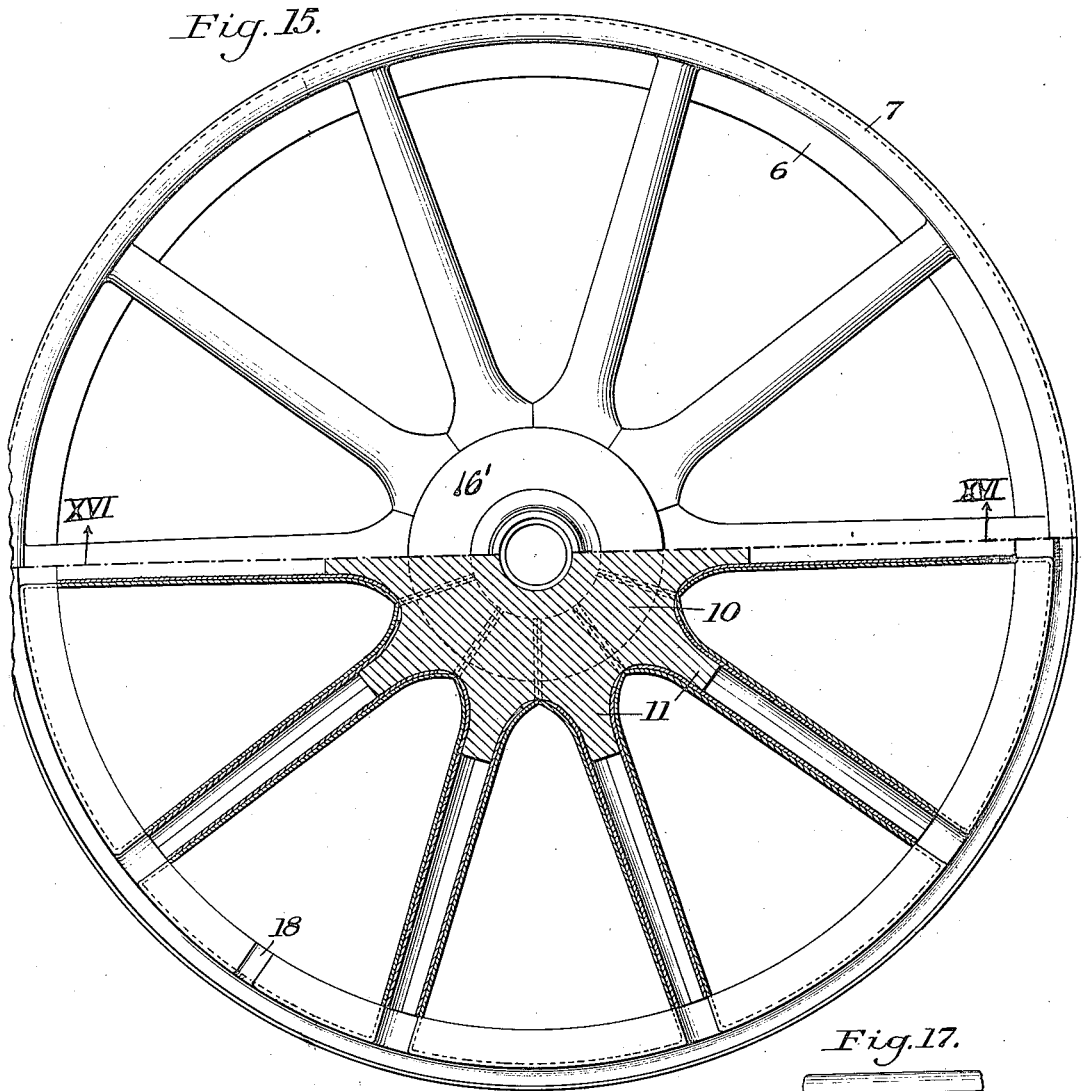
Fig. 17.
Fig. 16.
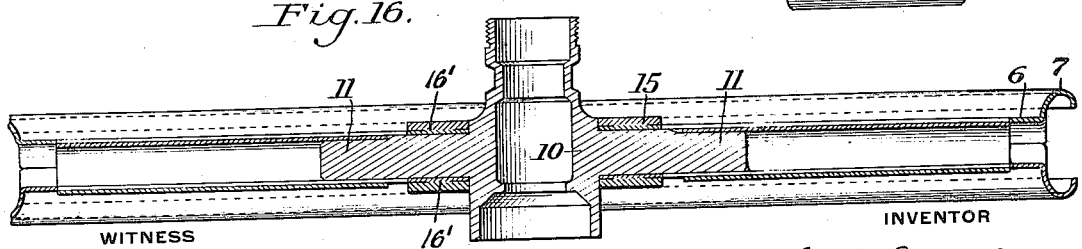

Patented Nov. 6, 1923.

1,473,283

UNITED STATES PATENT OFFICE.

JOHN C. CROMWELL, OF CLEVELAND, OHIO.

WHEEL.

Application filed January 19, 1920. Serial No. 352,531.

*To all whom it may concern:*

Be it known that I, JOHN C. CROMWELL, a citizen of the United States, residing at Cleveland, Cuyahoga County, Ohio, have invented a new and useful Improvement in Wheels, of which the following is a full, clear, and exact description.

The present invention relates broadly to wheels and more particularly to metallic wheels constructed for use with pneumatic or cushion tires for motor vehicles.

The principal object of the present invention is to provide a metallic wheel resembling, and adapted to replace, the ordinary wooden wheels commonly used.

Another object of the invention is to provide a metallic wheel in which the spokes may be formed integrally with the felloe, or separable therefrom as may be desired.

Still another object of the invention is to provide a metallic wheel constructed of two main substantially similar blanks each of which blanks forms approximately one-half of the completed wheel.

A further object of the inveniton is to so interlock the blanks that the spokes from the rim to what may be termed the hub are of two thicknesses of metal, one within the other.

A still further object of the present invention is to so dimension the spoke 'forming portions from the hub to the felloe that an edge to edge joint is produced, thereby obviating any abrupt breaks or overlapping seams.

The foregoing and other objects, together with their attendant advantages, will be apparent as the invention becomes better understood by reference to the accompanying specification and drawings forming a part thereof, it being premised that changes may be made in the various details and the manner of operation within the scope of the appended claims without departing from the spirit of the invention.

Figure 6 is an enlarged detail view of a completed spoke.

Figure 7 is a sectional view on the line VII—VII of Figure 6.

Figure 8 is a sectional view on the line VIII—VIII of Figure 6.

Figure 9 is a sectional view on the line IX—IX of Figure 6.

Figure 10 is a sectional view on the line X—X of Figure 6.

Figure 11 is a sectional view on the line XI—XI of Figure 6.

Figure 15 is a plan view partly in section of a completed wheel.

Figure 16 is a sectional view on the line XVI—XVI of Figure 15, and

Figure 17 is an enlarged detail view of the valve opening.

It is an important object of the present invention to provide a metallic wheel construction which resembles when completed the wooden wheel ordinarily employed. By providing a wheel of this type, the cost of construction of the wheels may be materially reduced. At the same time a more substantial wheel is provided, and one in which, due to the metallic spoke construction, the heat generated in the pneumatic or cushion tires will be dissipated by the entire wheel body. The wheel disclosed in the present application may be constructed by any desired method, but I preferably employ the method disclosed and claimed in my co-pending application, Serial No. 303,817, filed June 13, 1919.

Figure 1:
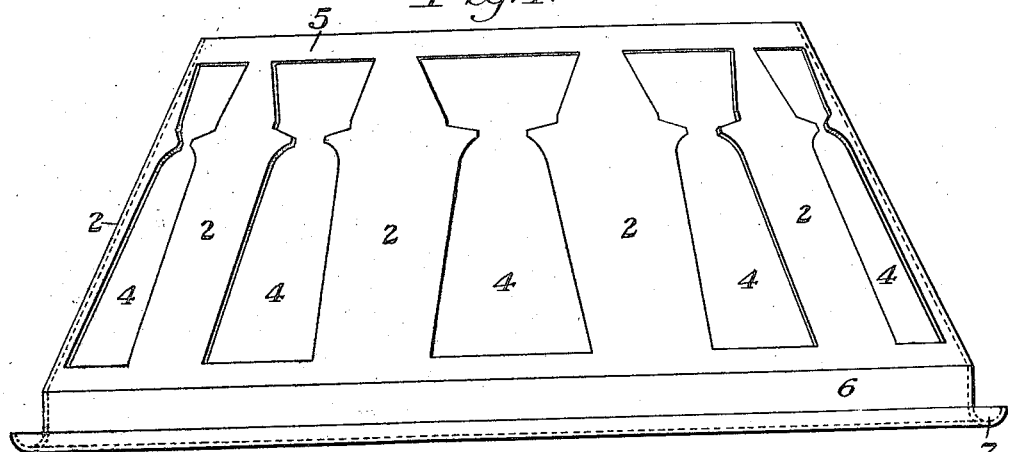
Figure 1 is a side view of a blank having spoke forming portions punched therein.
Figure 2:
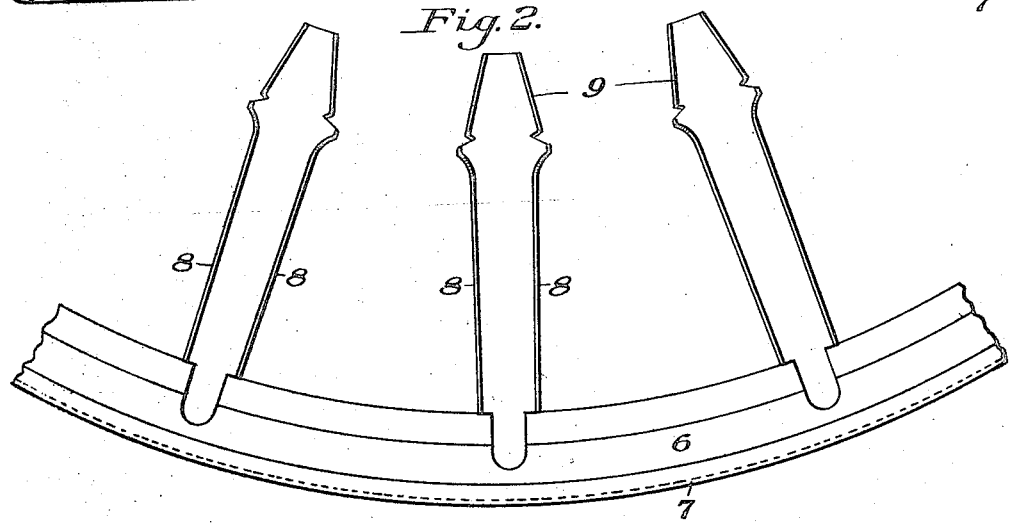
Figure 2 is a view corresponding to Figure 1 illustrating the method of bending the spoke-forming portions.
Figure 3:
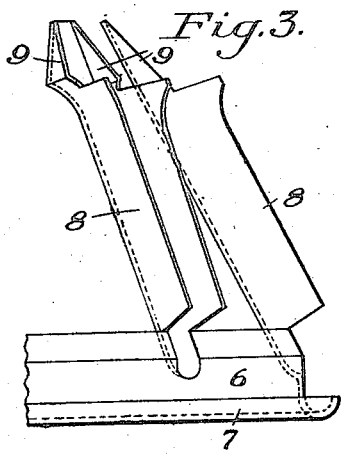
Figure 3 is a detail view of the construction shown in Figure 2.

In accordance with the present invention there is constructed in any desired manner a blank such as shown particularly in Figure 1 having a series of spoke-forming portions 2 formed by punching out alternate sections from the blank to form openings 4. In order to hold the spoke forming portions in proper position during the preliminary operations performed on the blank, their inner ends are preferably connected by a strip 5. The opposite ends of the spoke-forming portions 2 are connected by a rim forming portion 6 having a curved edge 7 adapted to interlock in the completed wheel structure with the bead of an ordinary cushion or pneumatic tire.

Figure 4:
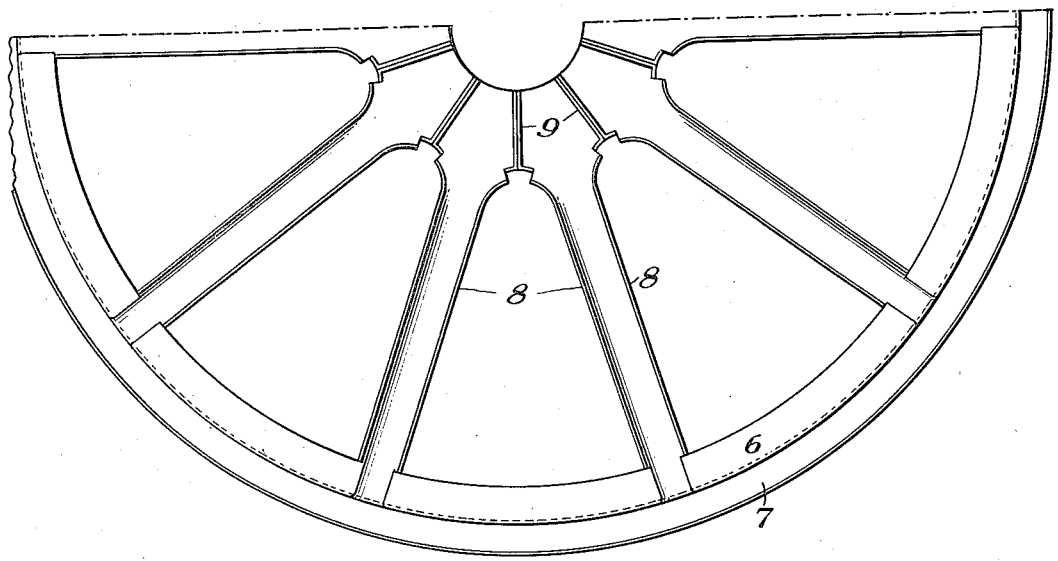
Figure 4 is a plan view of the blank after the spoke-forming portions have been bent into the plane of the wheel.
Figure 5:
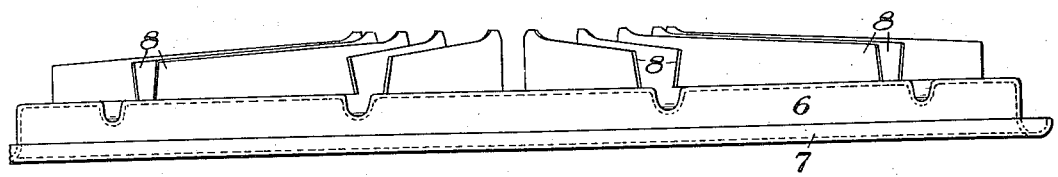
Figure 5 is an edge view of the construction illustrated in Figure 4.
Figure 12:
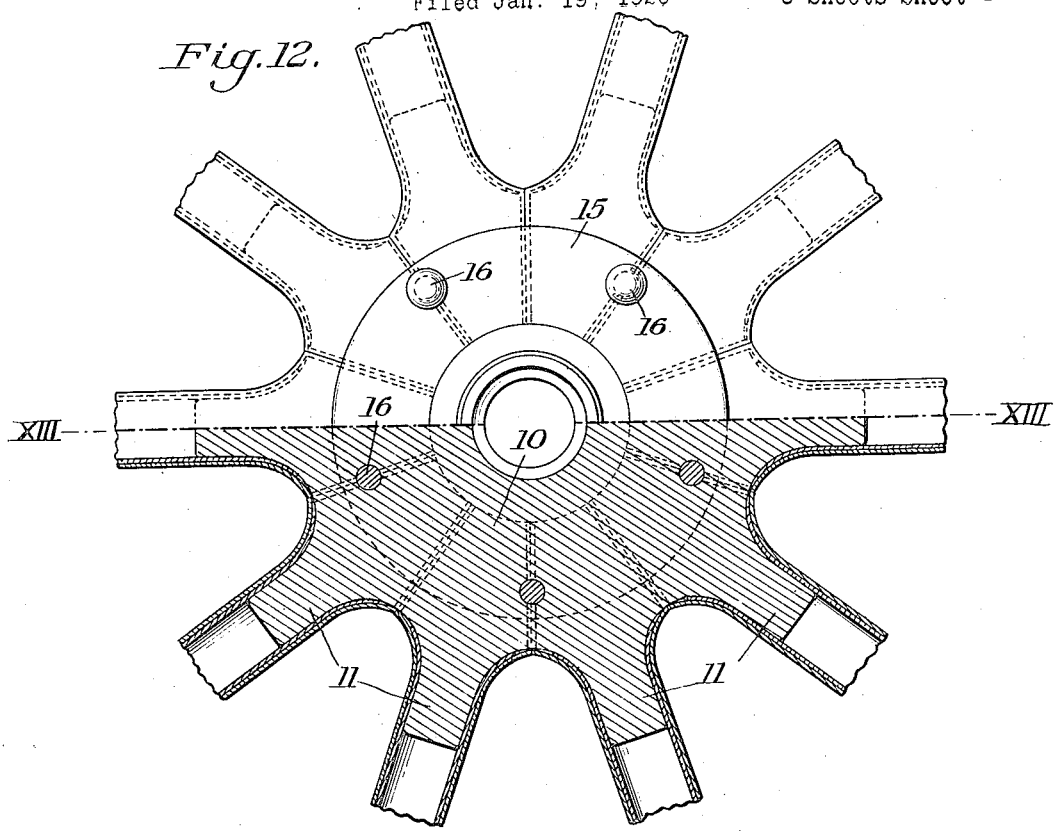
Figure 12 is a plan view partly in section illustrating a hub flange secured in position.
Figure 13:
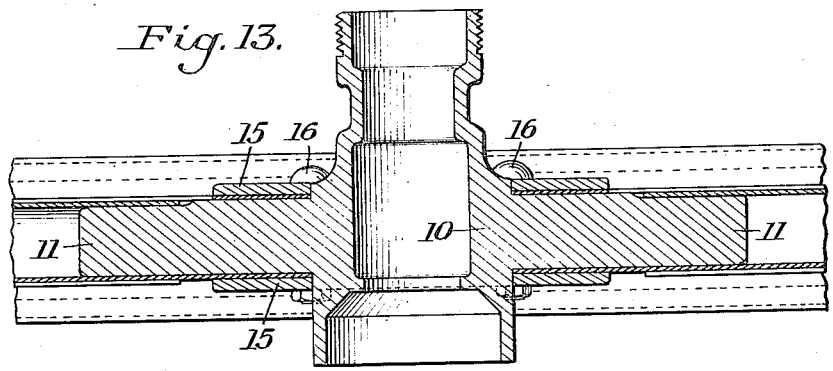
Figure 13 is a sectional view on the line XIII—XIII of Figure 12.

By any suitable method the connecting strip 5 is cut away and the edges of the spoke-forming portions 2 bent at substantially right angles to the main body thereof to form side flanges 8 and hub flanges 9 adapted to interlock with radial grooves formed in the hub member, as will be more fully described hereinafter. The spoke-forming portions are then preferably bent into the plane of the wheel so that the blank assumes the condition illustrated more particularly in Figures 4 and 5. Two blanks either of exactly, or substantially the same dimensions are then placed face to face on opposite sides of a hub member 10 having radial projections 11 corresponding in number to the number of spoke-forming portions provided in each of the blanks. The hub member 10 is provided with radially extending recesses 12 adapted to receive the flanges 9. Two of the blanks having been placed in position with the flanges 9 interlocking with the recesses 12 and the side flanges 8 of one set of spoke-forming members within the side flanges of the other set of spoke-forming members, the blanks are pressed together in a suitable die to interlock the blanks, one within the other, and shape the spokes.

It is desirable that the edges of the side flanges 8 of the set of spoke-forming members of the outer blank contact throughout substantially the entire length of the spoke to form a close seam. In order to insure such contact, the spoke-forming portions of the inner blank may be made of slightly less width than the spoke-forming portions of the outer blank, whereby when the blanks are pressed together about the hub member a space 14 will be left between the meeting edges of the flanges on said inner blank.

It will be apparent that, if desired, one of the blanks may be pressed about the hub member, and then the second blank interlocked with the hub member and the first mentioned blank, either method producing double walled spokes.

After the blanks have been assembled about the hub member, hub flanges 15 may be secured by suitable bolts or rivets 16 to opposite sides of the hub member, or they may be spot welded as indicated at 16' in Figure 16, thereby securely holding the inner ends of the spokes in position.

Figure 14:
Figure 14 is a detail view of a modified form of rim.

If desired, a separate rim member, such as illustrated in Figure 14, may be employed, and the spoke-forming portions pressed around the projection 17 thereon in substantially the same manner that they are pressed around the radial projections 11 of the hub member.

During the formation of the blanks, semi-circular openings 18 may be formed in each of the blanks, so that in the completed wheel an opening for the valve stem on the tire will be provided.

The advantages of the present invention arise from the construction resembling the usual wooden wheel, but having increased resiliency and heat dissipating powers due to its construction.

A further advantage arises from the provision of substantially tubular double-walled spokes, which spokes may be formed integrally with the rim portion of the wheel or separate therefrom so that they may be replaced as a unit.

I claim:

1. A metallic wheel, comprising a hub member and blanks pressed about said hub member from opposite sides thereof, said blanks each having spoke-forming portions formed therein, the spoke-forming portions of one of the blanks enveloping all of the spoke-forming portions of the other blank, substantially as described.

2. A metallic wheel, comprising a hub member having radial projections, and blanks pressed about said member and said projections from opposite sides thereof, said blanks having spoke-forming portions engaging said radial projections, substantially as described.

3. A metallic wheel, comprising a hub member having radial projections and radially extending grooves, a rim, and substantially tubular double-walled spokes engaging said projections and grooves extending from the hub member to the rim, substantially as described.

4. A metallic wheel, comprising a hub member, a rim, an inner blank having spoke-forming portions, and an outer blank having spoke-forming portions enclosing all of the spoke-forming portions of the inner blank, substantially as described.

5. A metallic wheel, comprising an inner blank and an outer blank, and spoke-forming portions in each of said blanks, said spoke-forming portions being independently formed at their inner ends, and the width of the spoke-forming portions of one of the blanks being less than the width of the spoke-forming portions of the other blank, substantially as described.

6. A metallic wheel, comprising an inner blank and an outer blank, spoke-forming portions in each of said blanks, said spoke-forming portions being independently formed at their inner ends, the width of the spoke-forming portions of one of the blanks being less than the width of the spoke-forming portions of the other blank, and a separate hub member secured in position by said blanks, substantially as described.

7. A wheel structure, comprising a hub member, a rim, and substantially tubular double-walled spokes extending from the hub member to the rim, the edges of the outer wall of each of the spokes forming a tight joint, and the inner ends of said spoke walls being independently formed, substantially as described.

8. A metallic wheel, comprising a hub member, a rim, and substantially tubular double-walled spokes extending from the hub member to the rim, the edges of the outer wall of each of the spokes abutting throughout substantially their entire length to form a tight joint, and the inner ends of said spoke walls being independently formed, substantially as described.

In testimony whereof, I have hereunto set my hand.

JOHN C. CROMWELL.